(12) United States Patent  
Haller et al.

(10) Patent No.: US 7,997,600 B2  
(45) Date of Patent: Aug. 16, 2011

(54) APPARATUS COMPRISING A SUSPENSION SYSTEM AND METHOD FOR ADJUSTING A SUSPENSION SYSTEM (75) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 124 days.

(21) Appl. No.: 12/275,447

(22) Filed: Nov. 21, 2008

(65) Prior Publication Data  
US 2009/0134595 A1 May 28, 2009

(51) Int. Cl.  
B60G 9/04 (2006.01)

(52) U.S. Cl. .............................................. 280/124.157

(58) Field of Classification Search ........... 280/124.157, 280/124.158, 124.159, 124.16, 124.161, 280/124.162, 124.164, 124.177, 6.15, 6.153, 280/6.155, 6.157; 267/64.16, 64.17, 276  
See application file for complete search history.

(56) References Cited

U.S. PATENT DOCUMENTS

| | | | |
|---|---|---|---|
| 2,973,968 A * | 3/1961 | Behles | 280/104 |
| 3,042,392 A * | 7/1962 | Schmitz et al. | 280/124.102 |
| 3,466,055 A | 9/1969 | Keijzer | |
| 3,552,763 A * | 1/1971 | Yasin | 280/104 |
| 3,762,769 A | 10/1973 | Poschl | |
| 3,938,770 A | 2/1976 | Turner et al. | |
| 3,966,223 A | 6/1976 | Carr | |
| 4,052,088 A * | 10/1977 | Nicholls | 280/124.102 |
| 4,159,105 A * | 6/1979 | Vander Laan et al. | 267/218 |
| 4,193,629 A | 3/1980 | Merkle | |
| 4,286,765 A | 9/1981 | Delgleize et al. | |
| 4,418,955 A | 12/1983 | Muncke et al. | |
| 4,451,079 A | 5/1984 | Takahashi | |
| 4,463,839 A | 8/1984 | Ashiba | |
| 4,469,010 A | 9/1984 | Skover, Jr. et al. | |
| 4,600,215 A | 7/1986 | Kuroki et al. | |
| 4,634,142 A | 1/1987 | Woods et al. | |
| 4,645,042 A | 2/1987 | Inoue et al. | |
| 4,645,169 A | 2/1987 | Mischer | |
| 4,684,100 A | 8/1987 | Grassl | |
| 4,700,971 A | 10/1987 | Doi et al. | |
| 4,726,604 A | 2/1988 | Asami et al. | |
| 4,729,539 A | 3/1988 | Nagata | |
| 4,729,580 A | 3/1988 | Buma et al. | |
| 4,733,847 A | 3/1988 | Grassl | |
| 4,822,094 A | 4/1989 | Oldfather et al. | |
| 4,852,863 A * | 8/1989 | Breitenbacher et al. | 267/218 |
| 4,946,145 A | 8/1990 | Kurabe | |
| 5,058,852 A | 10/1991 | Meier et al. | |
| 5,125,631 A | 6/1992 | Brodersen et al. | |
| 5,133,575 A * | 7/1992 | Zantinge et al. | 280/6.159 |
| 5,169,129 A * | 12/1992 | Hoffman | 267/64.27 |
| 5,176,355 A | 1/1993 | Carter | |

(Continued)

FOREIGN PATENT DOCUMENTS

DE 452315 11/1927

(Continued)

*Primary Examiner* — Faye M. Fleming  
(74) *Attorney, Agent, or Firm* — Black Lowe & Graham, PLLC (57) ABSTRACT

An apparatus having a suspension system with a first part which is acted upon by a mass, a second part, and also an air spring arranged between this first part and this second part. At least one supplementary volume device for air is provided, the volume of which can be varied in a controlled manner, and also a first control device for adjusting the volume of the supplementary volume device.

15 Claims, 6 Drawing Sheets

U.S. PATENT DOCUMENTS

| | | |
|---|---|---|
| 5,217,210 A | 6/1993 | Schützner |
| 5,234,203 A | 8/1993 | Smith |
| 5,255,935 A | 10/1993 | Imani |
| 5,324,069 A | 6/1994 | Ogawa |
| 5,413,316 A * | 5/1995 | Easter .................. 267/64.24 |
| 5,425,436 A | 6/1995 | Teramura et al. |
| 5,428,533 A | 6/1995 | Ogawa |
| 5,450,322 A | 9/1995 | Tanaka et al. |
| 5,533,703 A | 7/1996 | Grassl et al. |
| 5,536,059 A | 7/1996 | Amirouche |
| 5,555,501 A | 9/1996 | Furihata et al. |
| 5,558,398 A | 9/1996 | Santos |
| 5,564,520 A | 10/1996 | Forsythe |
| 5,603,387 A | 2/1997 | Beard et al. |
| 5,623,410 A | 4/1997 | Furihata et al. |
| 5,735,509 A | 4/1998 | Gryp et al. |
| 5,941,920 A | 8/1999 | Schubert |
| 6,000,703 A | 12/1999 | Schubert et al. |
| 6,029,764 A | 2/2000 | Schubert |
| 6,067,491 A | 5/2000 | Takahashi |
| 6,078,791 A | 6/2000 | Tuttle et al. |
| 6,082,715 A | 7/2000 | Vandermolen |
| 6,314,353 B1 | 11/2001 | Ohsaku et al. |
| 6,371,456 B1 | 4/2002 | Ritchie et al. |
| 6,490,930 B1 | 12/2002 | Ohkubo et al. |
| 6,616,116 B1 | 9/2003 | Rochau et al. |
| 7,152,839 B2 | 12/2006 | Mullinix et al. |
| 7,712,836 B2 | 5/2010 | Deml |
| 2001/0044685 A1 | 11/2001 | Schubert |
| 2003/0015830 A1 | 1/2003 | Miller et al. |
| 2003/0140487 A1 | 7/2003 | Plettner |
| 2004/0094912 A1 | 5/2004 | Niwa et al. |
| 2006/0185434 A1 | 8/2006 | Bernhagen |
| 2007/0236071 A1 | 10/2007 | Fujita et al. |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0272871 A1 | 11/2009 | Haller |
| 2010/0102493 A1 | 4/2010 | Deml et al. |
| 2010/0117428 A1 | 5/2010 | Deml et al. |
| 2010/0181708 A1 * | 7/2010 | Kolb et al. .................. 267/113 |

FOREIGN PATENT DOCUMENTS

| | | |
|---|---|---|
| DE | 2604809 | 8/1977 |
| DE | 8104855 | 8/1981 |
| DE | 220674 | 4/1985 |
| DE | 223835 | 8/1985 |
| DE | 3517503 | 11/1986 |
| DE | 4211628 | 10/1993 |
| DE | 4335199 | 5/1995 |
| DE | 19803750 | 8/1998 |
| DE | 19714576 | 10/1998 |
| DE | 19902224 | 4/2000 |
| DE | 19848821 | 5/2000 |
| DE | 20214583 | 1/2003 |
| DE | 10317134 | 6/2004 |
| DE | 10330198 | 2/2005 |
| DE | 102004054325 | 4/2006 |
| DE | 60121688 | 11/2006 |
| DE | 102005023090 | 11/2006 |
| DE | 102005043575 | 3/2007 |
| DE | 102005044214 | 3/2007 |
| EP | 0089794 | 9/1983 |
| EP | 0563948 | 4/1993 |
| EP | 0938999 | 9/1999 |
| EP | 1050749 | 11/2000 |
| EP | 1188608 | 3/2002 |
| EP | 1352595 | 10/2003 |
| EP | 1464866 | 10/2004 |
| EP | 1484205 | 12/2004 |
| EP | 1657471 | 5/2006 |
| EP | 1693655 | 8/2006 |
| EP | 1844979 | 10/2007 |
| FR | 287940 | 6/2006 |
| JP | 61075008 | 4/1986 |
| JP | 2133215 | 5/1990 |
| JP | 2197470 | 8/1990 |
| JP | 3200485 | 9/1991 |
| JP | 2004058695 | 2/2004 |
| JP | 2004185476 | 7/2004 |
| KR | 20020090377 | 12/2002 |
| WO | 8703256 | 6/1987 |
| WO | 8809270 | 12/1988 |
| WO | 8912766 | 12/1989 |
| WO | 0035708 | 6/2000 |
| WO | 0043952 | 7/2000 |
| WO | 0058125 | 10/2000 |
| WO | 02068229 | 9/2002 |
| WO | 2004057528 | 7/2004 |
| WO | 2005008578 | 1/2005 |
| WO | 2005022690 | 3/2005 |
| WO | 2005095153 | 10/2005 |
| WO | 2005102112 | 11/2005 |

* cited by examiner

APPARATUS COMPRISING A SUSPENSION SYSTEM AND METHOD FOR ADJUSTING A SUSPENSION SYSTEM

This application claims priority to Germany Application Serial No. 10 2007 056 700.8 filed Nov. 24, 2007, contents of which are incorporated herein.

FIELD OF THE INVENTION

The invention relates to an apparatus comprising a suspension system, and also to a method for adjusting such a suspension system.

BACKGROUND

Such suspension systems are used in a wide range of technical configurations. One example of a technical configuration using such a suspension system is the wheel suspension of various vehicles, such as motor vehicles for example. Sprung vehicle seats for utility vehicles, trucks and the like form another example of such a suspension system. Such vehicle seats are typically mounted on the floor of the motor vehicle, wherein this floor or the motor vehicle can be regarded as the second or fixed part. The seat surface of the vehicle seat can in this case be regarded as the first part, which can be acted upon by a mass, namely the weight of a driver. In such seats, often an air spring and optionally a scissors-type frame is provided between the first part or the seat surface and the second part or the vehicle floor or the vehicle mass. The air spring is in this case actively connected between the first part and the second part. Dampers may optionally be provided in addition.

One example of a configuration of the last-mentioned type is known from DE 10 2004 054325 B3. In the configuration proposed therein, the intention is to improve the suspension comfort, for which purpose it is proposed that the height of the seat surface relative to the vehicle floor is detected and the acceleration of the seat surface in the vertical direction is detected. Based on the corresponding measured data, the pressure in the air spring is then varied. In other words, it is proposed in DE 10 2004 054325 B3 to vary the quantity of air provided in the air spring as a function of the vertical acceleration and also the height of the driver's seat surface above the vehicle floor.

DD 220674 A1 discloses an active electrohydraulic vibration damper which, connected in parallel with a spring, is intended to have a damping effect on a vehicle seat.

DD 223835 A1 discloses an adjustment mechanism for a hybrid anti-vibration system with feedback of the absolute speed of the object, which can be used for seats and in which the acceleration is taken into account.

DE 601 21688 T2 discloses an active seat suspension system for a seat which is carried by a scissors-type frame above a seat substructure. Here, a hydraulic piston and an air cushion are provided between the seat and the substructure. The quantity of air in the constant-volume air cushion is controlled by a compressor and by a venting system. The configuration comprises an acceleration sensor and also a seat position sensor, the measured values from which are taken into account by an electronic control unit (ECU) when actuating the compressor and venting air.

SUMMARY

The object of the invention is to provide an apparatus comprising a suspension system and also a method for adjusting such a suspension system, which apparatus and/or method allows good adaptation to changing boundary conditions.

According to the invention, there is proposed in particular an apparatus comprising a suspension system according to claim 1. A method according to the invention for adjusting a suspension system forms the subject matter of claim 9. Preferred further developments form the subject matter of the dependent claims.

There is therefore proposed in particular an apparatus comprising a suspension system, wherein said suspension system comprises a first part which is acted upon by a mass, a second part, and also an air spring arranged between this first part and this part. Here, the first part may be the seat surface of a vehicle seat, such as for example the seat surface of a utility vehicle seat or truck seat or the like. The mass which acts upon this first part may be in particular the mass of a person sitting on the seat surface of the seat. The second part may be for example the floor of a vehicle, such as a truck or utility vehicle, or the body connected to the floor or another part fixedly connected to the floor. In such a configuration, the apparatus according to the invention is preferably the vehicle seat of a vehicle, such as a utility vehicle or truck, or such a vehicle itself.

However, it may also be provided that the suspension system is used for wheel suspension on vehicles, in particular motor vehicles, such as cars or trucks or utility vehicles. In this case, the first part may be for example the wheel of the motor vehicle and the second part may be the body of the motor vehicle, or vice versa.

The apparatus according to the invention comprises, in addition to the air spring, a supplementary volume device for air, the volume of which can be varied in a controlled manner. This apparatus also comprises a first control device for adjusting the volume of the supplementary volume device.

In one advantageous embodiment, it is provided that the supplementary volume device is in fluid connection with the air spring. For this purpose, it may for example be provided that a pressure line is provided between the supplementary volume device and the air spring. In this case, it is provided in particular that a pressure equalisation between the pressure in the air spring and the pressure in the supplementary volume device is made possible via this fluid connection. It may also be provided that the fluid connection between the supplementary volume device and the air spring can be interrupted. For this purpose, a suitable valve may be provided which can be moved into an open position and a closed position. Preferably provided between the air spring and the supplementary volume device is a fluid connection device which forms a thin point, such as e.g. a tube or pipeline or line.

In one particularly advantageous embodiment, it is provided that the first part and the second part are additionally coupled via a guide device. By way of example, such a guide device may be designed as a scissors-type frame, which is particularly suitable when the apparatus is configured as a vehicle seat or as a vehicle with a vehicle seat.

It may also be provided that, in addition to the air spring, a damper is provided between the first part and the second part. In an alternative embodiment, the apparatus according to the invention may also be such that such a damper is superfluous and the damping effect is brought about in particular by controlling the volume of the supplementary volume device.

In one particularly advantageous embodiment, the supplementary volume device is connected in series with the air spring via a fluid connection.

In one particularly advantageous and expedient embodiment, the supplementary volume device is configured in such a way that it can be used for retrofitting in vehicles.

It is provided in particular that the air spring forms a closed system with the supplementary volume device and the fluid connection arranged therebetween.

In addition, it may be provided that the system can be expanded to form an open system, or becomes an open system via additional functionalities. This may for example be such that the apparatus—when configured as a vehicle seat or as a vehicle with a vehicle seat—offers a functionality which is such that the volume located in the system can be adjusted, which can be used for example for seat height adjustment. For this purpose, it may for example be provided that the quantity of air located in the air spring and/or the supplementary volume can be increased by means of a pump or the like, or can also be decreased via suitable discharge devices.

In particular, it is preferably provided that the change in volume of the supplementary spring device takes place in the closed state of the system.

In particular, therefore, it is provided that the spring rate of the spring can be adjusted, namely in a closed system or by changing the volume of the supplementary spring device.

Also proposed in particular is a method according to claim 9. According to this method for adjusting a suspension system, an apparatus is provided which firstly determines at least one operating value of the apparatus and of the suspension system. This determination may be for example a detection or a measurement. For this purpose, a detecting or measuring device may be provided. However, it may also be provided that the operating value(s) are determined by calculation. The volume of the supplementary volume device is then adjusted as a function of the at least one determined operating value. In one advantageous embodiment, this may be such that the acceleration of the first part relative to the second part and also the relative position of the first part relative to the second part are used as operating values. When configured as a vehicle seat, for example, the relative position corresponds to the seat height in the vehicle if this value relates to the vertical relative position, which is preferably the case. Correspondingly, the acceleration is preferably the vertical acceleration of the first part relative to the second part. In this preferred embodiment, the nominal volume of the supplementary volume device is determined as a function of this acceleration and this relative position, and the nominal value is controlled by means of a control device. In a particularly preferred embodiment—in particular this refers both to the method and to the apparatus—the volume of the supplementary volume device is adjusted by means of an adjustment device.

BRIEF DESCRIPTION OF THE DRAWINGS

Various examples of embodiments of the invention will be explained in more detail below, without the invention being limited exclusively thereto. In the drawings.

DETAILED DESCRIPTION OF THE INVENTION

FIGS. 1, 2a, 2b and 2c show an example of embodiment of an apparatus according to the invention in a schematic view using the example of a driver's seat. This apparatus may be used in particular to carry out a method for actively reducing the exposure to vibrations and for level control in air-sprung driver's seats, namely for example in respect of the vertical introduction of vibrations. However, such a method or a method according to the invention can also be used for air-assisted longitudinal or side horizontal suspension systems.

Figure 1:
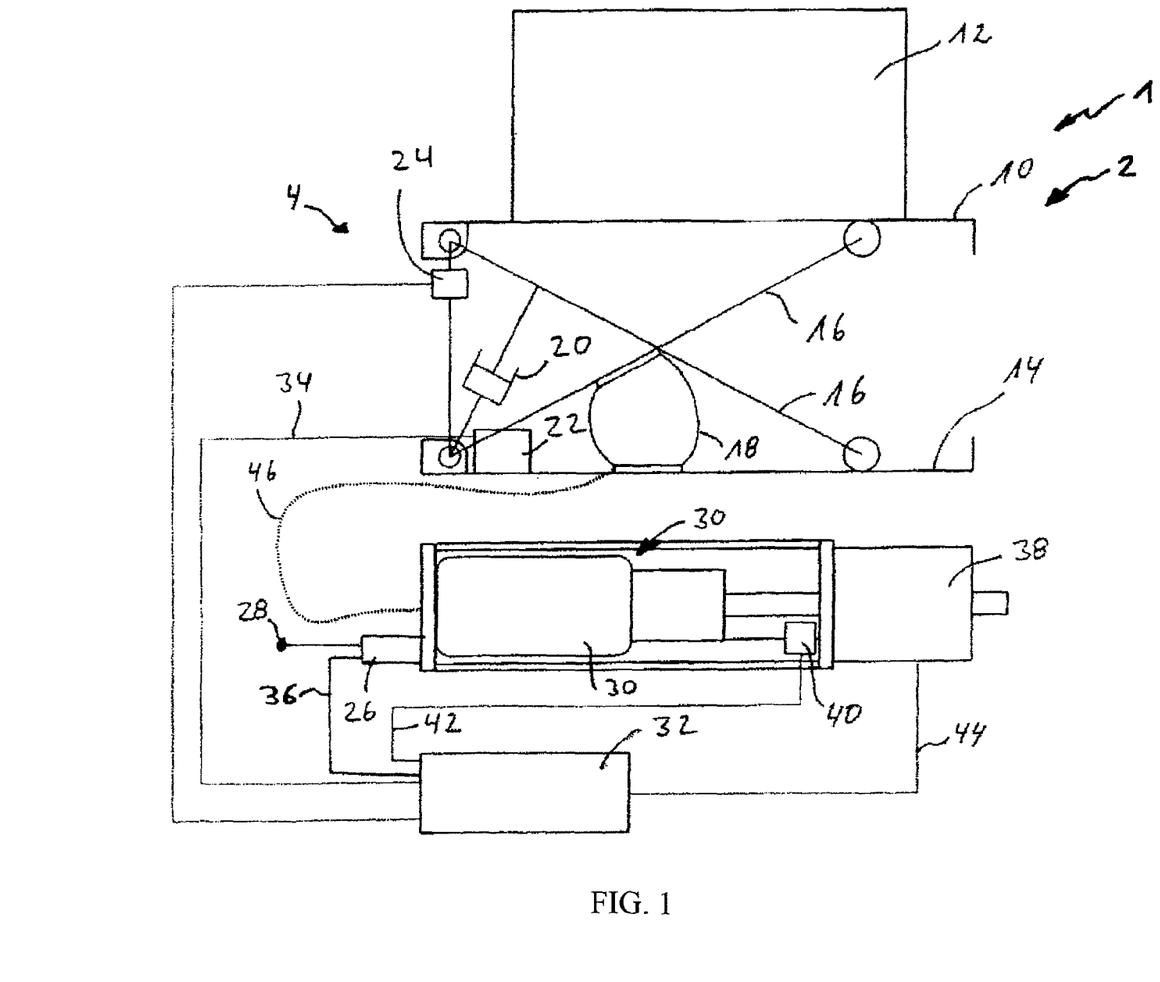
FIGS. 1, 2a, 2b and 2c show a first example of embodiment of an apparatus according to the invention.
Figure 2A:
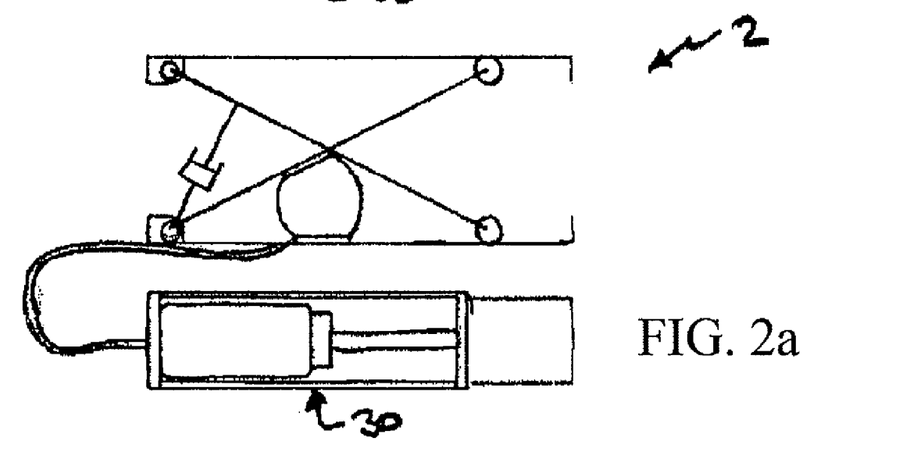
Figure 2B:
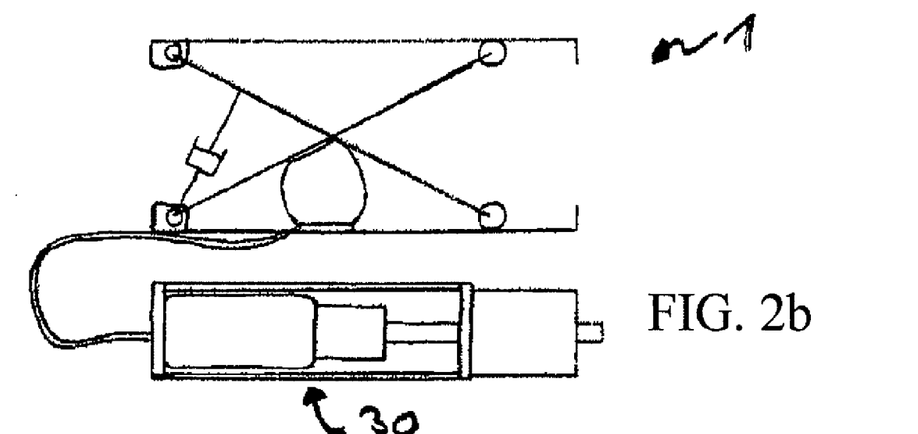
Figure 2C:
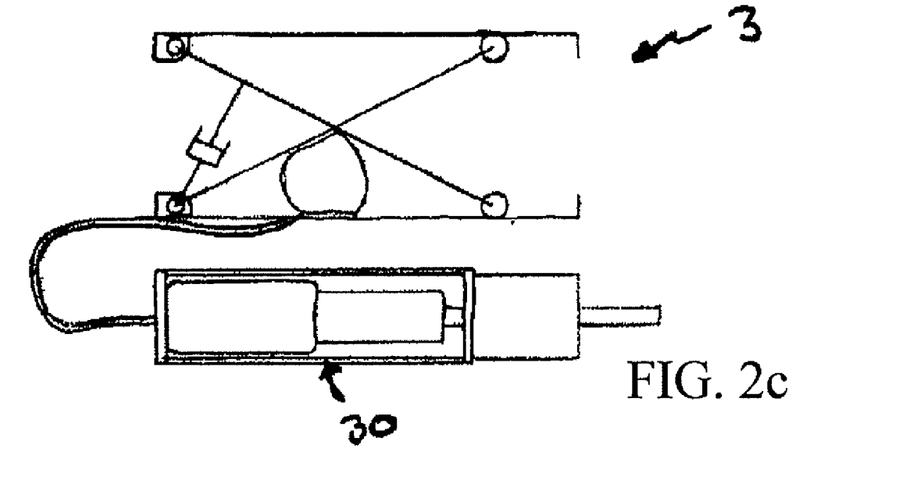

In connection with the configuration shown in FIGS. 1 to 2c, reference should also be made to an example of a method according to the invention.

FIGS. 1 to 2c show—in a schematic view—an example of an apparatus 1 according to the invention, which is configured here by way of example as a vehicle and driver's seat 2. The seat has a seat surface 10 forming a first part which is or can be acted upon by a mass 12. Here, the mass 12 is configured for example in the form of a person or a driver loading the seat. The person 12 or the mass 12 may also be referred to as the sprung mass.

Also provided is an unsprung mass which is formed for example by the lower part of the suspension or by the cab floor. This unsprung mass is in particular a second part 14, wherein this second part 14 may for example also form a foot of the seat or the like which is fixedly connected to the vehicle floor.

Between the first part 10 and the second part 14, there is a guide system which in this case is designed as a scissors-type system or scissors-type link system and couples the first part 10 to the second part 14 or connects a sprung mass 12 to an unsprung mass 14 (or connected to 14). The apparatus 1 furthermore comprises an air spring 18 which is arranged and acts between the first part 10 and the second part 14, and also a damper device 20 which is arranged and acts between the first part 10 and the second part 14. It should be noted that—where the air spring 18 is mentioned here—this air spring is a gas spring, with air preferably being used as the gas. The mass support between the unsprung mass 14 and the sprung mass 14 takes place in particular via an air spring 18. The damper 20 may be embodied in a hydraulically and/or semi-actively and/or actively controlled manner.

In the case of active volume adjustment, a damper may even be omitted completely, although this could be disadvantageous in the event of any failure of the active volume adjustment (fail-safe system in the event of a power failure).

The apparatus 1 or the suspension system 4 forming part thereof moreover comprises an acceleration sensor 22. This acceleration sensor 22 may be arranged for example in the unsprung region in order to detect vibrations introduced from the cab floor. It may be provided that the acceleration sensor 22 senses accelerations in the vertical direction. However, it may also be provided that the acceleration sensor 22 in addition or as an alternative senses accelerations in other dimensions.

A position sensor 24 is also provided. The position sensor 24 is arranged between the sprung mass 12 and the unsprung mass or between the first part 10 and the second part 14. The position sensor 24 serves to detect the relative seat height, which can be varied by the user or driver. The relative seat height may be adjusted through a supply to or discharge from the quantity of air located in the closed air system, via an air intake/discharge valve or "air intake/discharge" control valve which is connected to a pressure-conveying system 28, such as for example an on-board power supply, compressor or the like.

The apparatus 1 or the suspension system 4 furthermore comprises a supplementary volume or a supplementary volume device 30, the size of which can be varied and the volume of which can be varied with regard to its size. This supplementary volume device may be designed for example as an air spring bellows which is dimensionally stable in terms of its diameter. By means of this supplementary volume device 30 or the volume of this supplementary volume device 30, which is adjustable, the spring stiffness or spring rate of the air spring 18 or of the suspension system 4 can be adapted within a certain range to the respective requirements of the driver or to the unevenness of the road or to certain operating parameters.

The damper device 20 or the shock absorber 20 is in particular a hydraulic shock absorber. The position sensor 24 is in particular a sensor for the height or the level. Reference 32 denotes an electronic control unit (ECU) which forms part of the apparatus 1 or of the suspension system 4. Reference 34 denotes a signal line for the acceleration sensor for detecting the acceleration in the vertical direction or in the direction of the z-axis. This signal line 34 connects the acceleration sensor 22 to the electronic control unit 32.

Reference 36 denotes a control line for controlling the air intake/discharge. This control line 36 connects the electronic control unit 32 to the air intake/discharge control valve 26.

Reference 38 denotes an actuator for the supplementary volume or for varying the supplementary volume. This actuator 38 may be of electrical and/or hydraulic design for example.

Also provided in the configuration shown in FIGS. 1 to 2c is a position sensor 40 for detecting the position of the supplementary volume or of the actuator for adjusting the supplementary volume. Reference 42 denotes a "position sensor—actuator" signal line. The signal line 42 connects the position sensor to the electronic control unit 32. Reference 44 denotes an "actuator—supplementary volume" control line. The control line 44 connects the actuator 38 for adjusting the supplementary volume to the electronic control unit 32.

Reference 46 denotes an "air spring—supplementary volume" pressure line. The "air spring—supplementary volume" pressure line connects the supplementary volume 30 to the air spring 18 via a fluid connection.

It may be provided that the change in size of the supplementary volume or of the supplementary volume device 30 is selected by the driver or user. To this end, for example a multi-stage or even continuously adjustable manual controller or operating element may be selected and transmitted as a signal via the electronic control unit to the actuator 38. The actuator 38 here is for example an electrical compact cylinder. The nominal value of the pre-selected volume size may be checked for example via the position sensor 40 and newly registered as the 0 value for the active adjustment.

The active adjustment of the volume size may be activated via the position sensor 24 starting from the 0 value of the pre-set spring rate due to the acceleration occurring on the base or on the second part 14 or as a function of the relative height position. Depending on the type and intensity of the vibrations occurring on the base or on the second part 14 and/or the relative seat height, and taking account of the available residual spring travels, it may be provided that, by increasing or reducing the supplementary volume via the actuator 38, the spring rate is permanently adapted to the corresponding force introductions within a characteristic range defined via the electronic control unit 32. These additionally introduced forces may act both counter to the introduction and also in the direction of the introduction.

The level control of the seat height may take place on the basis of a deviation of the actual value on the position sensor 40 from the nominal value of the relative seat height, which is stored in the electronic control unit 32 as a result of a previously performed height setting. Here, the adjustment volume can be increased and/or reduced accordingly via the actuator 38.

The active level control is used here preferably only temporarily in order to compensate changes in the mass 12 due to shifts in weight such as e.g. travelling over peaks/troughs, carrying out braking maneuvers, etc. It is also possible to use this system of changing the volume in order to compensate any leakage losses in good time.

Longer-lasting level corrections via the adjustment volume can be replaced by the supply or discharge of compressed air via the control valve 26 after a certain period of time or after evaluation by the electronic control unit 32. In this case, at the same time, with evaluation via the electronic control unit 32, the adjustment volume is returned to its 0 value, which is checked via the position sensor 40.

FIGS. 2a, 2b and 2c show the embodiment according to FIG. 1—in a partial view—in three different positions or with three different volumes of the supplementary volume device 30.

The volume of the supplementary volume device 30 is at its lowest in the embodiment shown in FIG. 2a, and is at its greatest in the position shown in FIG. 2c. FIG. 2b shows a middle position. The embodiment shown in FIG. 2a can also be referred to as the "active-up" position, the position shown in FIG. 2b can also be referred to as the "active-middle" position, and the position shown in FIG. 2c can also be referred to as the "active-down" position.

The multi-stage or continuous adjustment possibility of the spring characteristic makes it possible for the driver to change individually the basic hardness of the suspension.

FIG. 2b shows a middle position of the supplementary volume device 30. The limit positions of the maximum adjustment are shown in the diagrams shown in FIGS. 2a and 2c.

The references from FIG. 1 have largely been omitted in FIGS. 2a to 2c for the sake of clarity.

Figure 3:
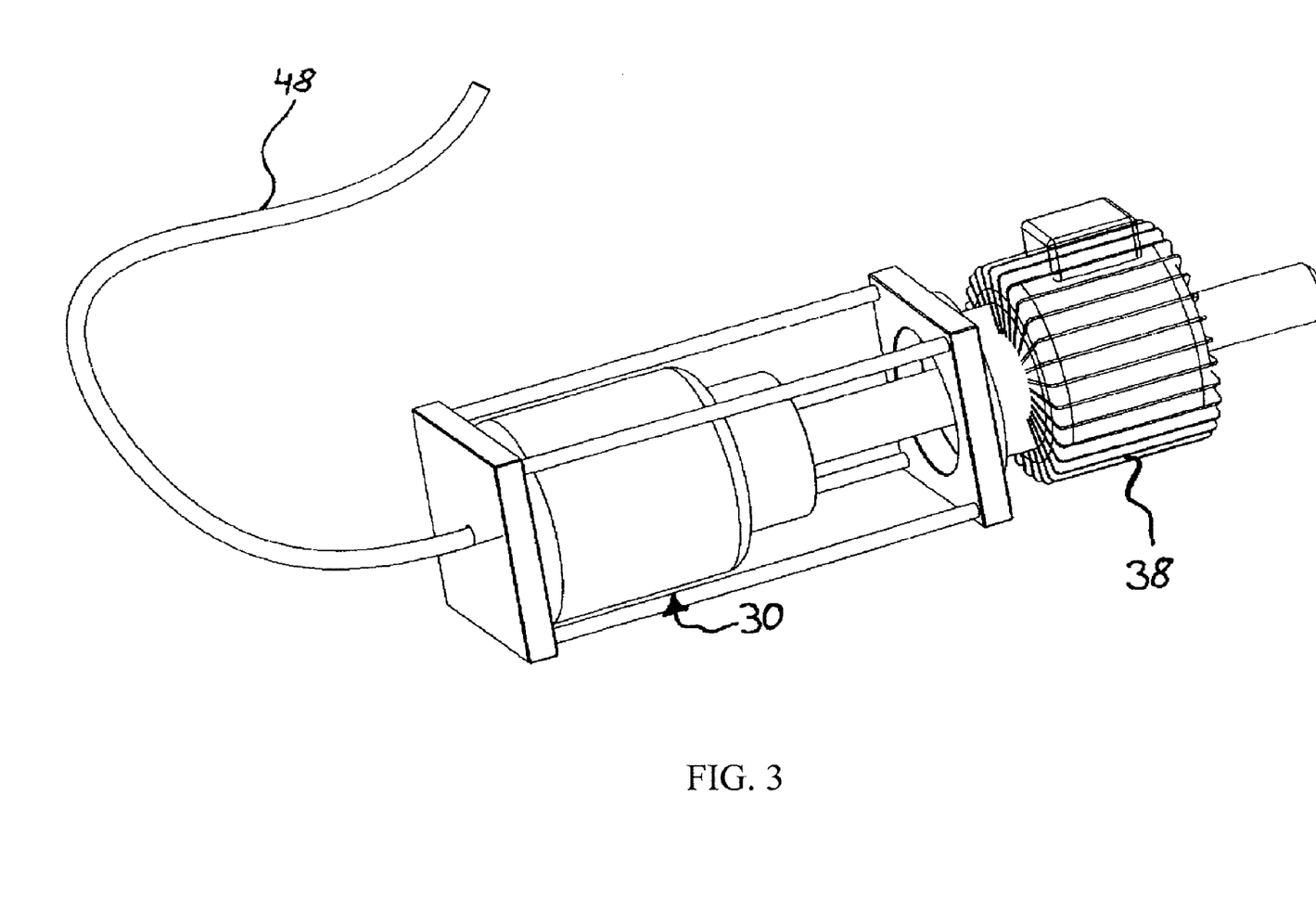
FIG. 3 shows a second example of embodiment of an apparatus according to the invention, wherein this apparatus may be designed in particular according to the schematic configuration shown in FIGS. 1 to 2c.

FIG. 3 shows an example of a model of an active volume change/adjustment device in a partially schematic view, as may be provided for example in the embodiments shown in FIGS. 1 and 2a to 2c.

Figure 4:
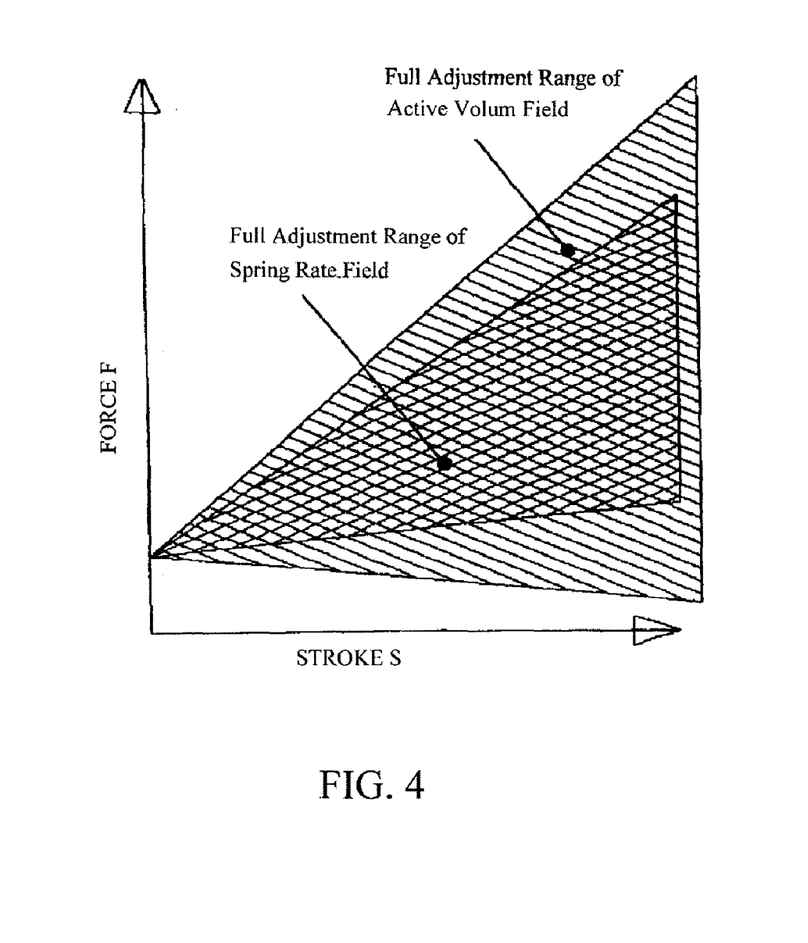
FIGS. 4 and 5 show examples of force/travel curves which may be obtained for example in the configurations shown in FIGS. 1 to 2c and 3.
Figure 5:
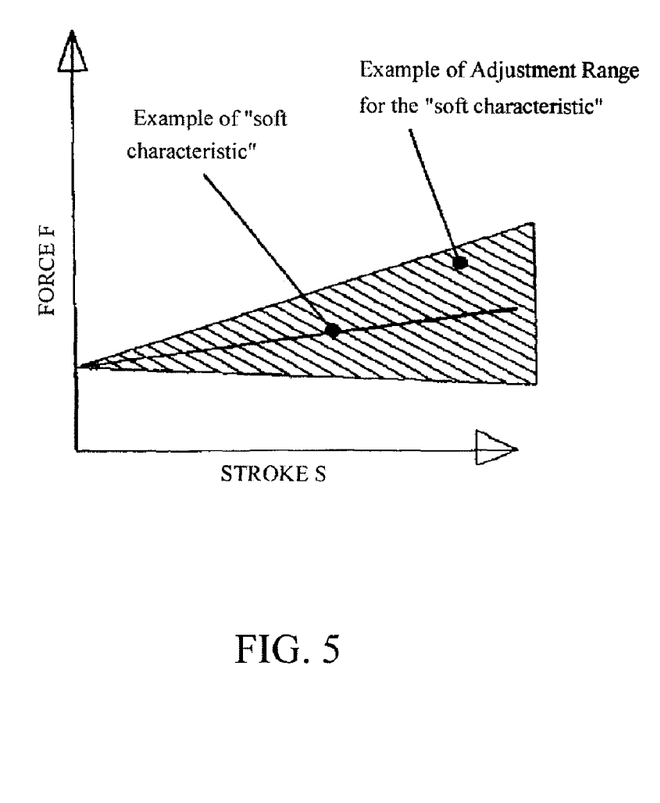

FIGS. 4 and 5 show two diagrams which may characterise examples of properties of the embodiment shown in FIGS. 1, 2a to 2c and 3.

FIGS. 4 and 5 show the force/stroke or force/travel curve, that is to say the curve of the force plotted against the stroke or travel.

The full adjustment range of the "active volume" field is shown by the hatched area in FIG. 4.

The crosshatched, smaller area in FIG. 4 shows the full adjustment range of the "spring rate" field.

The area clearly hatched in FIG. 5 is an example of an adjustment range for the "soft characteristic". The bold line running through this area is an example of a "soft characteristic".

The active volume adjustment exists in all comfort positions, but may be adapted in terms of dynamics to the change in intensity of the air damping.

The method or the apparatus therefore offers the possibility of automatic comfort maximisation. Here, the active parameters such as acceleration, excursion of the suspension and relative seat height evaluated via the electronic control unit 32, which may also be designed as an electronic adjustment unit, form the preset for the optionally selectable volume size, in order to obtain an ideal situation in terms of vibration isolation and suspension comfort for the driver.

Figure 6:
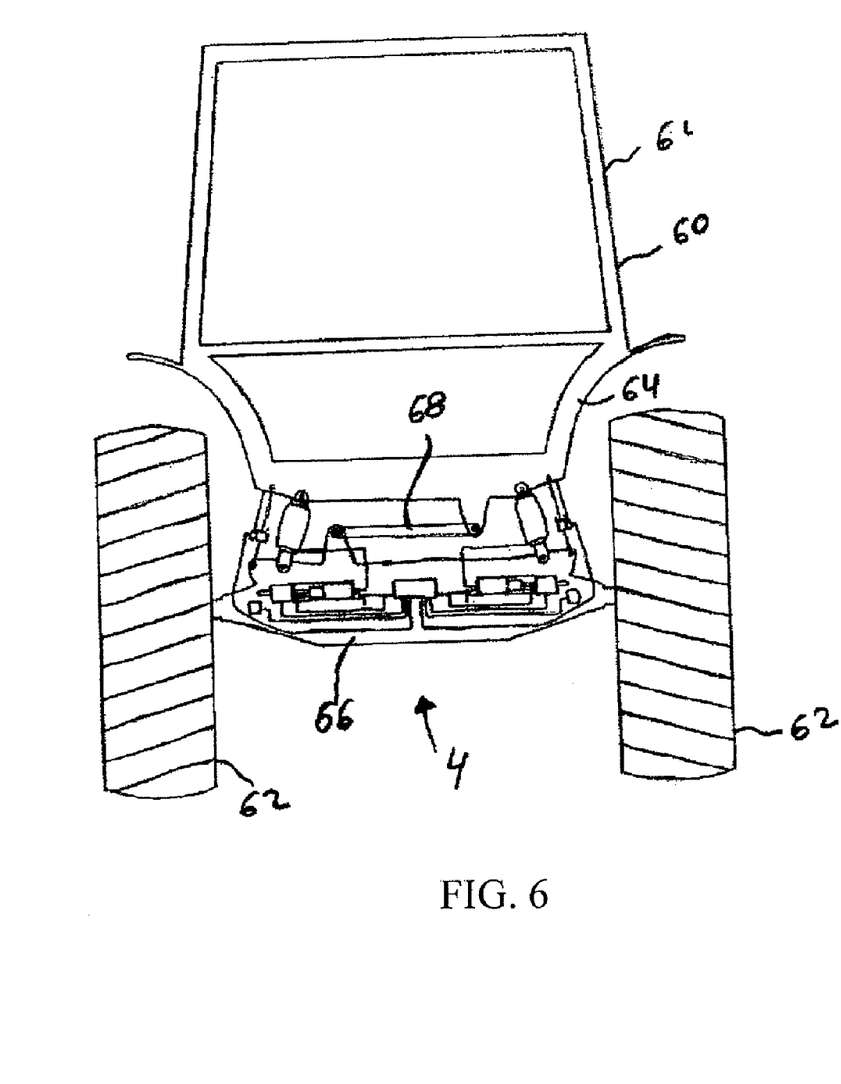
FIGS. 6 and 7 show a third example of embodiment of an apparatus according to the invention.
Figure 7:
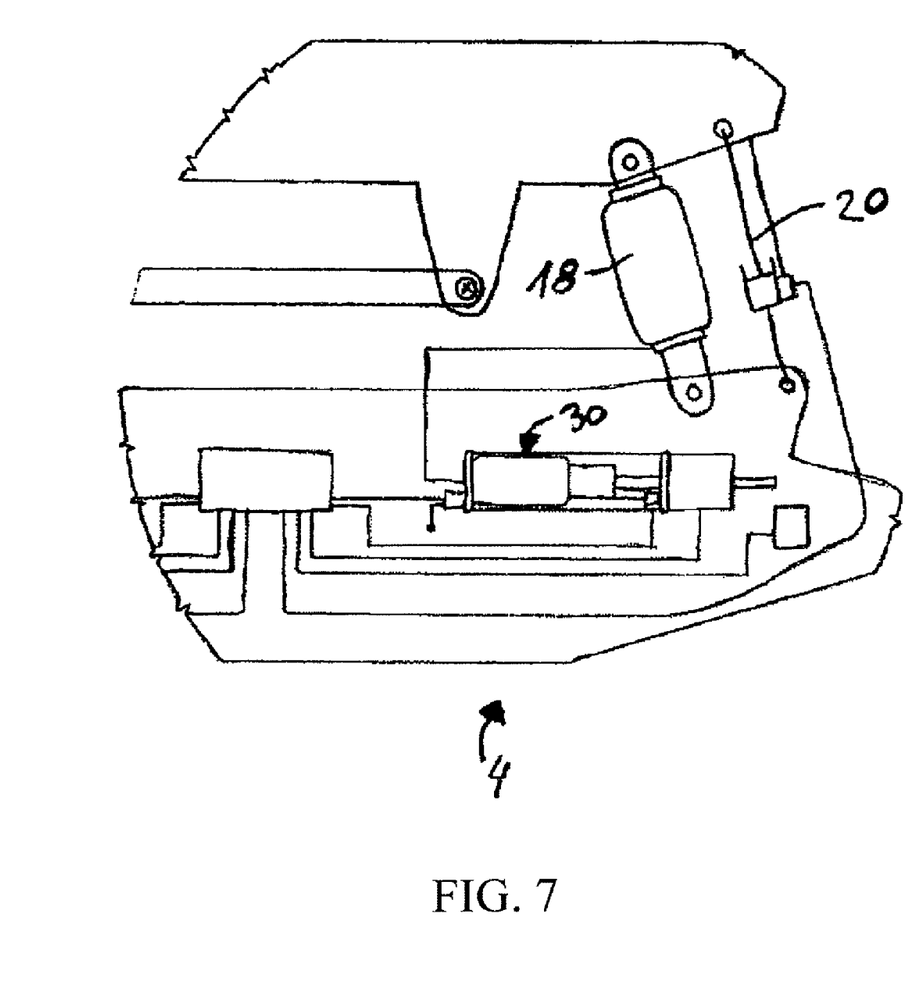

FIGS. 6 and 7 show a further example of embodiment of an apparatus according to the invention, by means of which a method according to the invention can also be carried out.

In FIGS. 6 and 7, the apparatus 1 is designed as a vehicle, in particular as a utility vehicle or truck or the like, comprising a driver's cab 60, vehicle wheels 62 and a suspension system 4 arranged therebetween. It may also be conceivable that the apparatus 1 is designed as a wheel suspension.

FIG. 7 shows an enlarged detail from FIG. 6 in the region of the suspension system 4.

It can be seen from the diagram of this suspension system that the latter is configured in a manner similar to the embodiment shown in FIGS. 1 and 2a to 2c, so that reference is made to what was stated above in respect of details relating thereto.

The apparatus shown in FIGS. 6 and 7 is in particular an apparatus for actively reducing the exposure to vibrations in the cab region, and also for level control or for active roll stabilisation in pneumatically controlled driver's cabs. In particular, it is provided that this apparatus can also be used to carry out a method for actively reducing the exposure to vibration in the cab region, and/or for level control or active roll stabilisation in pneumatically sprung driver's cabs. The mode of operation of this apparatus can preferably be used both for partially and for fully air-sprung vehicle cabs.

An external air supply (consumption control) is used for this method and the apparatus as in known systems. To this end, a corresponding additional load 64 is required only for pressure adaptation. The adjustment system, which has an active influence on the vibration behaviour and roll stabilisation of the cab, is designed here as a closed system.

The roll stabilisation, which is necessary in the case of 3D degrees of freedom of the mass 64 relative to the mass 66, is made possible by fitting one active volume per air spring. Transverse and longitudinal link rods 68 additionally serve to fix the position of the mass 64 relative to the mass 66.

By means of the active roll stabilisation, it is possible to counteract transverse or longitudinal inclinations of the cab 60 which occur for example as a result of corresponding force introductions, rapid travelling around bends, travelling uphill or braking process.

As a result of the transverse accelerations detected via a 3D acceleration sensor, it is also possible via a preventive inclination technique towards the inside of the bend, made possible by the active volume, to provide better compensation of the vertical accelerations and forces which act in the driver's seat or on the driver via the cab floor, due to the resultant which runs almost in the same direction as the force introduction. The longitudinal and transverse accelerations occurring in the region of the sprung mass 60 and 64 are also considerably reduced by the active roll stabilisation. Longitudinal or side horizontal suspensions in driver's seats, which as is known are intended for this purpose, are considerably relieved of load here.

In particular, a 3D isolation of the vibrations introduced onto the cab via the vehicle frame 66 can be brought about.

By virtue of the invention, the vibration properties of the vehicle seat or of an apparatus can be actively influenced and varied by means of a variable supplementary volume.

This active actuator can also be used to reduce the vibration exposure for the vehicle driver.

Moreover, given a suitable configuration of the apparatus, it may also as an active actuator make a contribution to level control and to maintaining the seat height.

All of the features disclosed in the application documents are claimed as essential to the invention in so far as they are novel individually or in combination with respect to the prior art.

The invention claimed is:

1. An apparatus comprising a suspension system, the suspension system comprising:
   a first part which is acted upon by a mass;
   a second part;
   an air spring arranged between the first part and the second part;
   at least one supplementary volume device, the volume of which is varied in a controlled manner;
   a position sensor for detecting the position of the at least one supplementary volume device, thereby determining the volume of the at least one supplementary volume device; and
   a first control device for automatically adjusting the volume of the supplementary volume device based on at least the determined volume of the at least one supplementary volume device,
   wherein the supplementary volume device is configured as a piston/cylinder unit.

2. The apparatus according to claim 1, wherein the air spring is coupled to the supplementary volume device via a fluid connector so that a fluid exchange is possible.

3. The apparatus according to claim 1, wherein the supplementary volume device is configured as a bellows.

4. The apparatus according to claim 1, wherein the first part is a vibrating part, and the second part is a stationary part.

5. The apparatus according to claim 1, wherein the first part is coupled to the second part via a guide device.

6. The apparatus according to claim 1, wherein the first part is coupled to the second part via a scissors-type frame.

7. The apparatus according to claim 1, further comprising a damper connected between the first part and the second part.

8. A method for adjusting a suspension system of an apparatus, which the suspension system comprises a first part which is acted upon by a mass, a second part, and also an air spring arranged between this first part and this second part, and at least one supplementary volume device which is coupled to the air spring via a fluid connection and the volume of which can be adjusted, in particular for adjusting a suspension system of an apparatus according to one of the preceding claims, comprising the steps:
   determining at least one operating value of at least one of the apparatus or the suspension system;
   sensing acceleration of the second part;
   sensing position of the first part relative to the second part;
   determined volume of the at least one supplementary volume device; and
   automatically adjusting the volume of the supplementary volume device as a function of the at least one determined operating value, the sensed acceleration, the sensed position of the first part and the determined volume of the at least one supplementary volume device.

9. The method according to claim 8, wherein a first determined operating value is acceleration of the first part relative to the second part, and a second determined operating value is the relative position of the first part relative to the second part, adjusting the volume of the at least one supplementary volume device as one of a function of the determined acceleration or as a function of the determined relative position.

10. The apparatus according to claim 7, wherein the at least one supplementary volume device comprises:
   a controllable actuator; and
   a control valve for controlling at least one of intake or discharge of air from an air source into an air chamber of the at least one supplementary volume device,
   wherein the apparatus further comprises:

a position sensor for determining position of the first part relative to the second part;

an acceleration sensor for determining acceleration of the second part; and an electronic control unit, in signal communication with the position sensors, the acceleration sensor, the controllable actuator and the control valve, for automatically controlling operation of the controllable actuator and the control valve based on signals received from the position sensors and the acceleration sensor.

11. The apparatus according to claim 10, wherein the determined volume of the at least one supplementary volume device comprises a nominal value of a pre-selected volume size that is registered at the electronic control unit as a null value for active adjustment.

12. The apparatus according to claim 11, wherein the controllable actuator upon receiving control signals from the electronic control unit actively adjusts the volume of the supplementary volume device starting from the null value based on at least one of the determined acceleration or the determined position of the first part relative to the second part.

13. An apparatus comprising a suspension system, the suspension system comprising:

a first part which is acted upon by a mass;

a second part;

a damper connected between the first part and the second part;

an air spring arranged between the first part and the second part;

at least one supplementary volume device, the volume of which is varied in a controlled manner;

a position sensor for detecting the position of the at least one supplementary volume device, thereby determining the volume of the at least one supplementary volume device;

a first control device for automatically adjusting the volume of the supplementary volume device based on at least the determined volume of the at least one supplementary volume device, wherein the at least one supplementary volume device comprises:

a controllable actuator; and a control valve for controlling at least one of intake or discharge of air from an air source into an air chamber of the at least one supplementary volume device;

a position sensor for determining position of the first part relative to the second part;

an acceleration sensor for determining acceleration of the second part; and an electronic control unit, in signal communication with the position sensors, the acceleration sensor, the controllable actuator and the control valve, for automatically controlling operation of the controllable actuator and the control valve based on signals received from the position sensors and the acceleration sensor.

14. The apparatus according to claim 13, wherein the determined volume of the at least one supplementary volume device comprises a nominal value of a pre-selected volume size that is registered at the electronic control unit as a null value for active adjustment.

15. The apparatus according to claim 14, wherein the controllable actuator upon receiving control signals from the electronic control unit actively adjusts the volume of the supplementary volume device starting from the null value based on at least one of the determined acceleration or the determined position of the first part relative to the second part.

* * * * *